(12) United States Patent
Iles et al.

(10) Patent No.: US 9,584,418 B2
(45) Date of Patent: Feb. 28, 2017

(54) QUANTIZED CONGESTION NOTIFICATION FOR COMPUTING ENVIRONMENTS

(71) Applicant: International Business Machines Corporation, Armonk, NY (US)

(72) Inventors: David Iles, San Jose, CA (US); Meenakshi R. Kaushik, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 386 days.

(21) Appl. No.: 14/051,314

(22) Filed: Oct. 10, 2013

(65) Prior Publication Data

US 2015/0103659 A1    Apr. 16, 2015

(51) Int. Cl.
*H04L 12/825* (2013.01)
*H04L 12/801* (2013.01)

(52) U.S. Cl.
CPC .............. *H04L 47/11* (2013.01); *H04L 47/12* (2013.01); *H04L 47/263* (2013.01)

(58) Field of Classification Search
CPC ...... H04L 47/12–47/127; H04L 47/225; H04L 47/26–47/266
See application file for complete search history.

(56) References Cited

U.S. PATENT DOCUMENTS

| | | | |
|---|---|---|---|
| 2007/0081454 A1* | 4/2007 | Bergamasco et al. | 370/229 |
| 2010/0257263 A1* | 10/2010 | Casado et al. | 709/223 |
| 2012/0063316 A1 | 3/2012 | Ghanwani et al. | |
| 2013/0039176 A1* | 2/2013 | Kanode et al. | 370/230 |
| 2013/0124753 A1 | 5/2013 | Ansari et al. | |
| 2013/0246655 A1* | 9/2013 | Itoh | H04L 12/56 709/238 |
| 2014/0133354 A1* | 5/2014 | Scharf et al. | 370/254 |
| 2016/0036706 A1* | 2/2016 | Hiscock | H04L 12/462 370/230 |

FOREIGN PATENT DOCUMENTS

WO    2011/155392 A1    12/2011

OTHER PUBLICATIONS

Recio, OpenFlow in Enterprise Data Centers Products, Lessons and Requirements, 2012, IBM, 21 pages.*
OpenFlow Switch Specification—Version 1.1.0 Implemented (Wire Protocol 0x02), Feb. 28, 2011, 56 pages.*

(Continued)

*Primary Examiner* — Hoon J Chung
(74) *Attorney, Agent, or Firm* — Sherman IP LLP; Kenneth L. Sherman; Steven Laut

(57) ABSTRACT

Embodiments of the invention relate to providing quantized congestion notification (QCN) in networks. One embodiment includes a method that includes determining a traffic flow congestion by a particular congestion point (CP) unit of multiple CP units that communicate with at least one end unit, at least one reaction point (RP) unit and at least one controller in a network. A first congestion notification message (CNM) and a second CNM are generated by the particular CP unit. The particular CP unit sends the first CNM directly to the controller and the second CNM directly to the RP unit. Traffic flow is managed among the multiple CP units by the controller based on the first CNM.

20 Claims, 7 Drawing Sheets

(56) References Cited

OTHER PUBLICATIONS

Papadimitriou, D., et al., Open Research Issues in Internet Congestion Control (RFC6077), IP.com, Feb. 1, 2011, pp. 1-103, USA.
Karagiannis, G. et al., "Overview of Pre-Congestion Notification Encoding (RFC6627)," IP.com, Jul. 1, 2012, pp. 1-41, USA.
Ahmed, U., et al., "Performance Evaluation of Explicit Congestion Notification (ECN) in IP Networks (RFC2884)," IP.com, Jul. 1, 2000, pp. 1-16, USA.
Mell, P. et al., "The NIST Definition of Cloud Computing", Special Publication, Version 15, Oct. 7, 2009, 2 pages, National Institute of Standards and Technology, Information Technology Laboratory, USA.

* cited by examiner

US 9,584,418 B2

QUANTIZED CONGESTION NOTIFICATION FOR COMPUTING ENVIRONMENTS

BACKGROUND

Embodiments of the invention relate to quantized congestion notification (QCN) for computing environments and, in particular, providing QCN for OpenFlow networks/Software Defined Networks (SDN).

QCN is an end-to-end congestion avoidance technique where the end-node/Reaction Point (RP) throttle the communication traffic flow based on Congestion Notification Messages (CNM) feedback from the Congestion Points (CP), such as edge bridge switches. With QCN, the congestion checks and CNM generation are performed in hardware. The CNMs are relayed to the RP indirectly through each CP. At the end-station or node, the RP implements queues in the network interface card (NIC)/converged network adapter (CNA) and react to CNMs messages to reduce or eliminate congestion and packet drop.

BRIEF SUMMARY

Embodiments of the invention relate to providing quantized congestion notification (QCN) in networks. One embodiment provides a method that comprises determining a traffic flow congestion by a particular congestion point (CP) unit of multiple CP units that communicate with at least one end unit, at least one reaction point (RP) unit and at least one controller in a network. A first congestion notification message (CNM) and a second CNM are generated by the particular CP unit. The particular CP unit sends the first CNM directly to the controller and the second CNM to the RP unit. Traffic flow is managed among the multiple CP units by the controller based on the first CNM.

Another embodiment comprises a computer program product for providing QCN in a network. The computer program product comprises a computer readable storage medium having program code embodied therewith, the program code readable/executable by a processor to perform a method comprising: determining, by a particular CP unit of a plurality of CP units, traffic flow congestion. In one embodiment, the plurality of CP units each communicate with at least one end unit, at least one RP unit and at least one controller in a network. The particular CP unit generates a first CNM and a second CNM. The particular CP unit sends the first CNM directly to the at least one controller and the second CNM to the at least one RP unit. The at least one controller manages traffic flow among the plurality of CP units based on the first CNM.

One embodiment comprises a system including an end node device, a plurality of CP devices coupled to the end host device, an RP device coupled to the plurality of CP devices, and a controller coupled to the plurality of CP devices. In one embodiment, a particular CP device of the plurality of CP devices determines a traffic flow congestion, generates a first CNM and a second CNM, sends the first CNM directly to the controller and sends the second CNM to the RP device. The controller manages traffic flow among the plurality of CP devices based on the first CNM.

These and other features, aspects, and advantages of the present invention will become understood with reference to the following description, appended claims, and accompanying figures.

DETAILED DESCRIPTION

Figure 1:
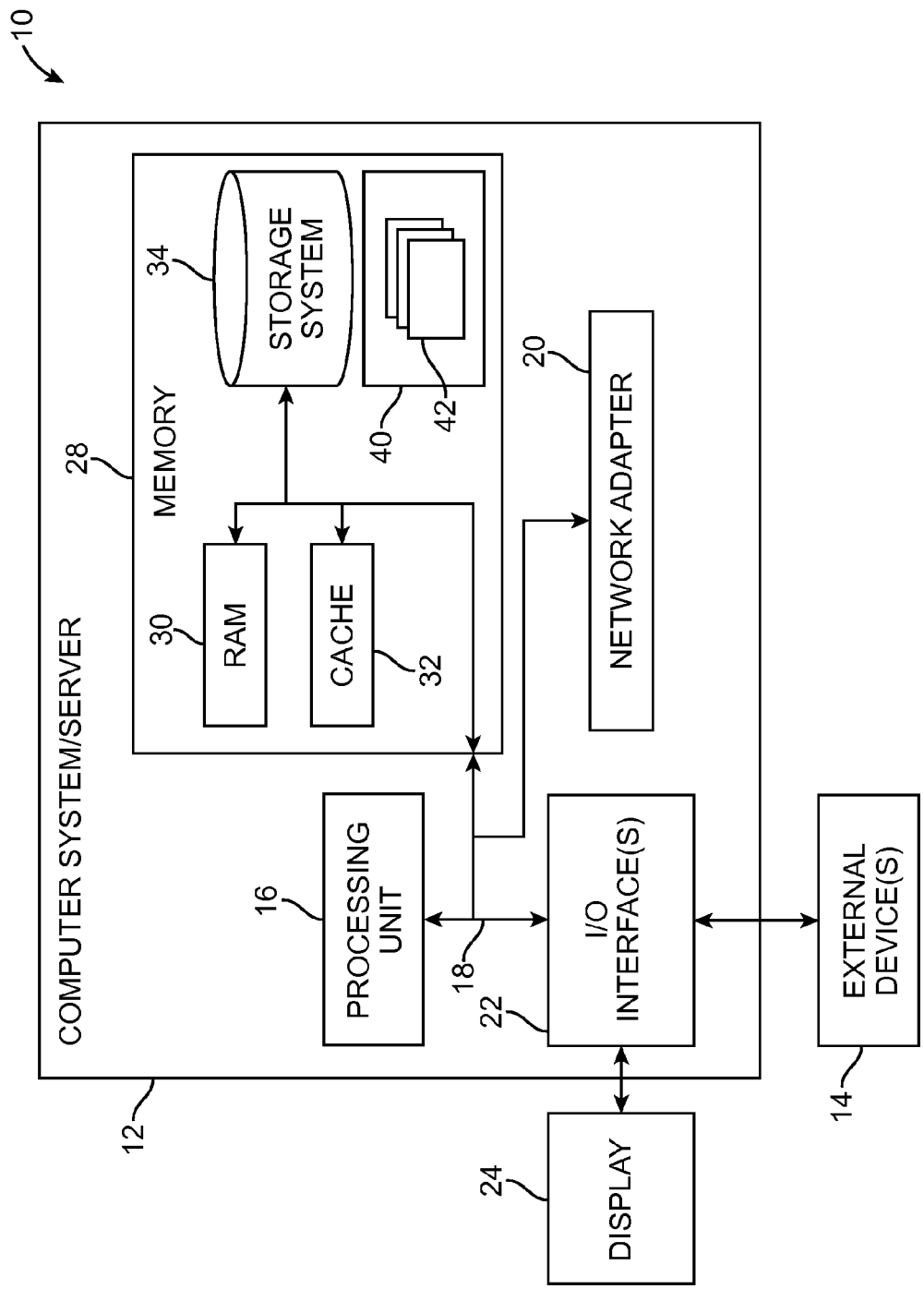
FIG. 1 depicts a cloud computing node, according to an embodiment of the present invention.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines (VMs), and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed and automatically, without requiring human interaction with the service's provider.

Broad network access: capabilities are available over a network and accessed through standard mechanisms that promote use by heterogeneous, thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned and, in some cases, automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported, thereby providing transparency for both the provider and consumer of the utilized service.

Service Models are as follows:

Software as a Service (SaaS): the capability provided to the consumer is the ability to use the provider's applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is the ability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is a service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media, including memory storage devices.

As shown in FIG. 1, computer system/server 12 in cloud computing node 10 is shown in the form of a general purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example and not limitation, such architectures include a(n) Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile/non-volatile media, and removable/non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, a storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in a memory 28 by way of example and not limitation, as well as an operating system, one or more application programs, other program modules, and program data. Each of the operating systems, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14, such as a keyboard, a pointing device, etc.; a display 24; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks, such as a local area network (LAN), a general wide area network (WAN), and/or a public network (e.g., the Internet) via a network adapter 20. As depicted, the network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, data archival storage systems, etc.

Figure 2:
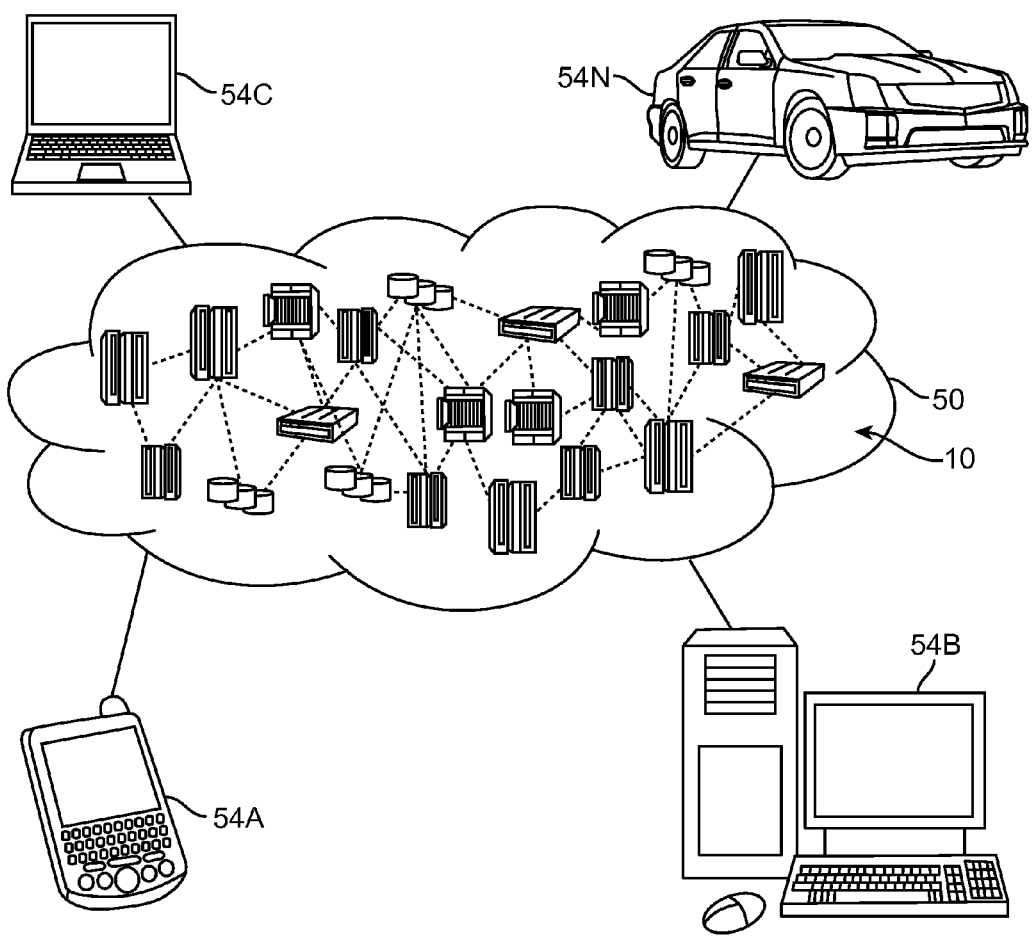
FIG. 2 depicts a cloud computing environment, according to an embodiment of the present invention.

Referring now to FIG. 2, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows the cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
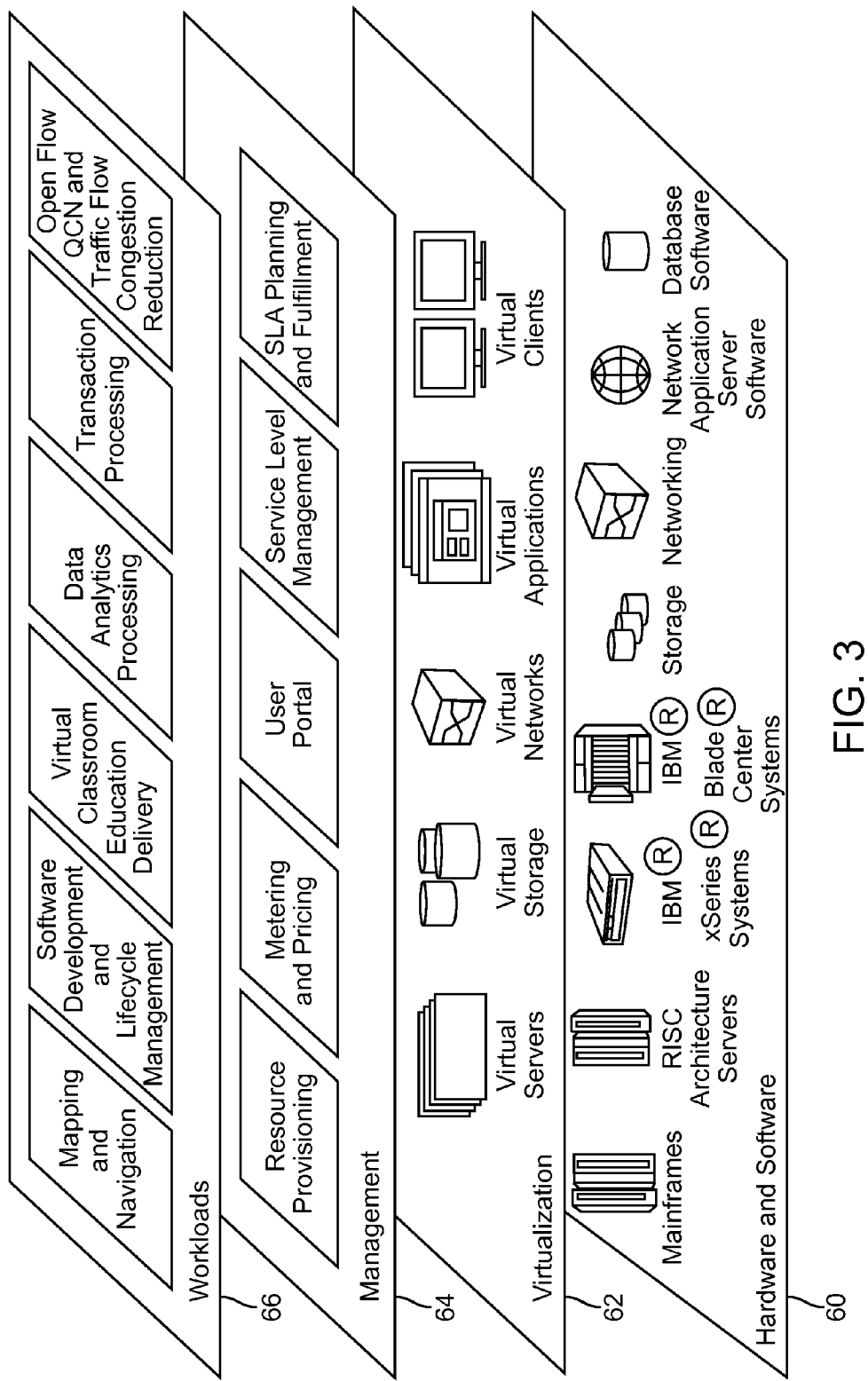
FIG. 3 depicts a set of abstraction model layers, according to an embodiment of the present invention.

Referring now to FIG. 3, a set of functional abstraction layers provided by the cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

A hardware and software layer 60 includes hardware and software components. Examples of hardware components include mainframes. In one example, hardware components comprise IBM® zSeries® systems and RISC (Reduced Instruction Set Computer) architecture-based servers. In one example, hardware components comprise IBM pSeries® systems, IBM xSeries® systems, IBM BladeCenter® systems, storage devices, networks, and networking components. Examples of software components include network application server software. In one example, software components comprise IBM WebSphere® application server software and database software. In one example, software components comprise IBM DB2® database software. (IBM, zSeries, pSeries, xSeries, BladeCenter, WebSphere, and DB2 are trademarks of International Business Machines Corporation registered in many jurisdictions worldwide.)

A virtualization layer 62 provides an abstraction layer from which the following examples of virtual entities may be provided: virtual servers; virtual storage; virtual networks, including virtual private networks; virtual applications and operating systems; and virtual clients.

In one example, a management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment and provide billing or invoicing for consumption of these resources. In one example, these resources may comprise application software licenses. Security provides identity verification for cloud consumers and tasks as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

A workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and Open Flow QCN and traffic flow congestion reduction. As mentioned above, all of the foregoing examples described with respect to FIG. 3 are illustrative only, and the invention is not limited to these examples.

It is understood all functions of the present invention as described herein are typically performed by the system 600 (FIG. 6), which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of clustered computing environment now known or later developed.

Embodiments of the invention relate to QCN in networks (e.g., a datacenter network, Open Flow networks, SDN, edge virtual bridging (EVB) networks, end-to-end networks, etc. One embodiment provides a method that that comprises determining a traffic flow congestion by a particular CP unit (e.g., an edge bridge including a physical switch, an edge switch, etc.) of multiple CP units that communicate with at least one end unit, at least one RP unit (end device/node, server, etc.) and at least one controller (e.g., an Open Flow controller, SDN controller, etc.) in a network. A first CNM and a second CNM are generated by the particular CP unit. The particular CP unit sends the first CNM directly to the controller and the second CNM directly to the RP unit. Traffic flow is managed among the multiple CP units by the controller based on the first CNM.

One embodiment comprises a system including an end node device, a plurality of CP devices coupled to the end host device, an RP device coupled to the plurality of CP devices, and a controller coupled to the plurality of CP devices. In one embodiment, a particular CP device of the plurality of CP devices determines a traffic flow congestion, generates a first CNM and a second CNM, sends the first CNM directly to the controller and sends the second CNM directly to the RP device. The controller manages traffic flow among the plurality of CP devices based on the first CNM.

Figure 4:
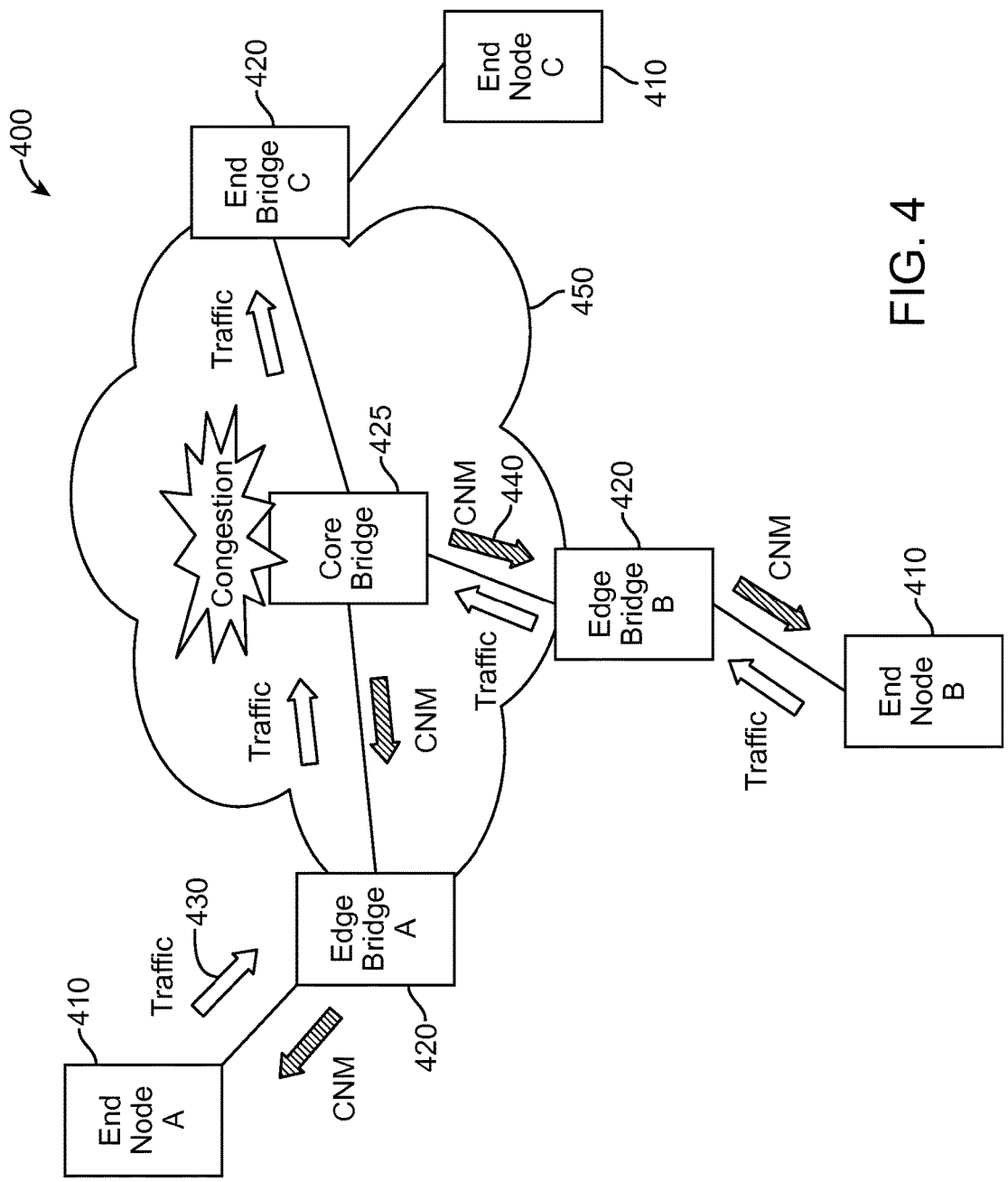
FIG. 4 is a block diagram illustrating a data center system using quantized congestion notification (QCN).

FIG. 4 is a block diagram illustrating a data center system 400 using QCN. The data center system 400 includes end node devices A-C 410, end bridge devices A-C 420, a core bridge device 425 and traffic flow 430 (from sources) within a network 450 (e.g., wired, wireless, cloud environment, hybrid, etc.). QCN is a congestion control mechanism for a network (e.g., a data center) that uses Ethernet communication. CPs (e.g., core bridge 425) send CNMs 440 (e.g., negative feedback signals) to RPs (e.g., End nodes A-C 410, and end host with a rate limiter, counter and timer, etc.). The RP responds to the CNM 440 congestion signals by throttling traffic (e.g., cutting the traffic flow rate), where lack of such signals trigger an RP to increase its rate fast recovery, additive increase and hyper additive increase. QCN as implemented in system 400 is originally incorporated in IEEE Std 802.1Qau (now incorporated into IEEE 802.1Q-2011), which specifies protocols, procedures and managed objects that support congestion management of long-lived data flows within network domains of limited bandwidth delay product. The QCN mechanism is achieved by enabling bridges to signal congestion information to end stations capable of transmission rate limiting to avoid frame loss. This mechanism enables support for higher layer protocols that are highly loss or latency sensitive. Virtual local area network (VLAN) tag encoded priority values are allocated to segregate frames subject to congestion control, allowing simultaneous support of both congestion controlled and other higher layer protocols. The IEEE Std 802.1Qau standard does not specify communication or reception of congestion notification information to or from stations outside the congestion controlled domain or encapsulation of frames from those stations across the domain.

QCN is independent of upper layer protocols that may coexist with TCP (i.e., nested control loops of congestion notification and TCP flow control produce reasonable behavior), may have Unicast traffic, supports bandwidth delay products of 5 Mbit, operates over a domain where all bridges (e.g., edge bridges A-C 420, core bridge 425) and end stations (e.g., end nodes A-C 410) support congestion notification using CNM 440.

In system 400, the core bridge 425 detects congestion when a traffic queue is above an equilibrium level, and generates and sends a CNM 440 to a traffic source (e.g., end node A 410 and end node B 410). The traffic source may tag frames with a congestion notification tag, which may contain a 2 byte Flow ID (meaning local to source) that is returned in the CNM 440. The Flow ID allows a source to identify the traffic flow to apply a rate limit.

The CNM 440 may include the following: version information in 4 bits, a quantized feedback message with 6 bits (a function of cnmQoffset and cnmQDelta), an 8 byte CP Identifier (CPID) (CPID may be used to identify the congestion location), cnmQoffset (units of 64 bytes—2 byte), cnmQDelta (units of 64 bytes—2 byte), a 3 bit encapsulated priority (i.e., priority of the sampled frame), a 6 byte encapsulated destination MAC address (DA of sampled frame), a 2 byte encapsulated MSDU length (max value 64), and an encapsulated MSDU (up to 64 bytes).

CNMs 440 are normally transmitted at a higher priority than other data traffic to reduce reaction time. An encapsulated MSDU may be used to forward CNMs 440 produced by a bridge that receives tunneled frames (e.g., in an IEEE 802.1 Provider Backbone Bridged (PBB) Network (PBBN), frames are encapsulated with an outer address that identifies the PBB edge bridges, not frame source and destination (IEEE 802.1Q 32.16)). A bridge in the PBBN sends the CNM 440 to the edge bridge (e.g., edge bridge A-C 420) destination address (DA). The PBB edge bridge removes the inner source address (SA), DA, VLAN Tag and CMN Tag, if present, from the encapsulated MSDU field, places the DA in the Flow ID in encapsulated destination MAC address field, adds the CMN-Tag and VLAN Tag to the frame, and sends the frame to the inner SA.

Figure 5:
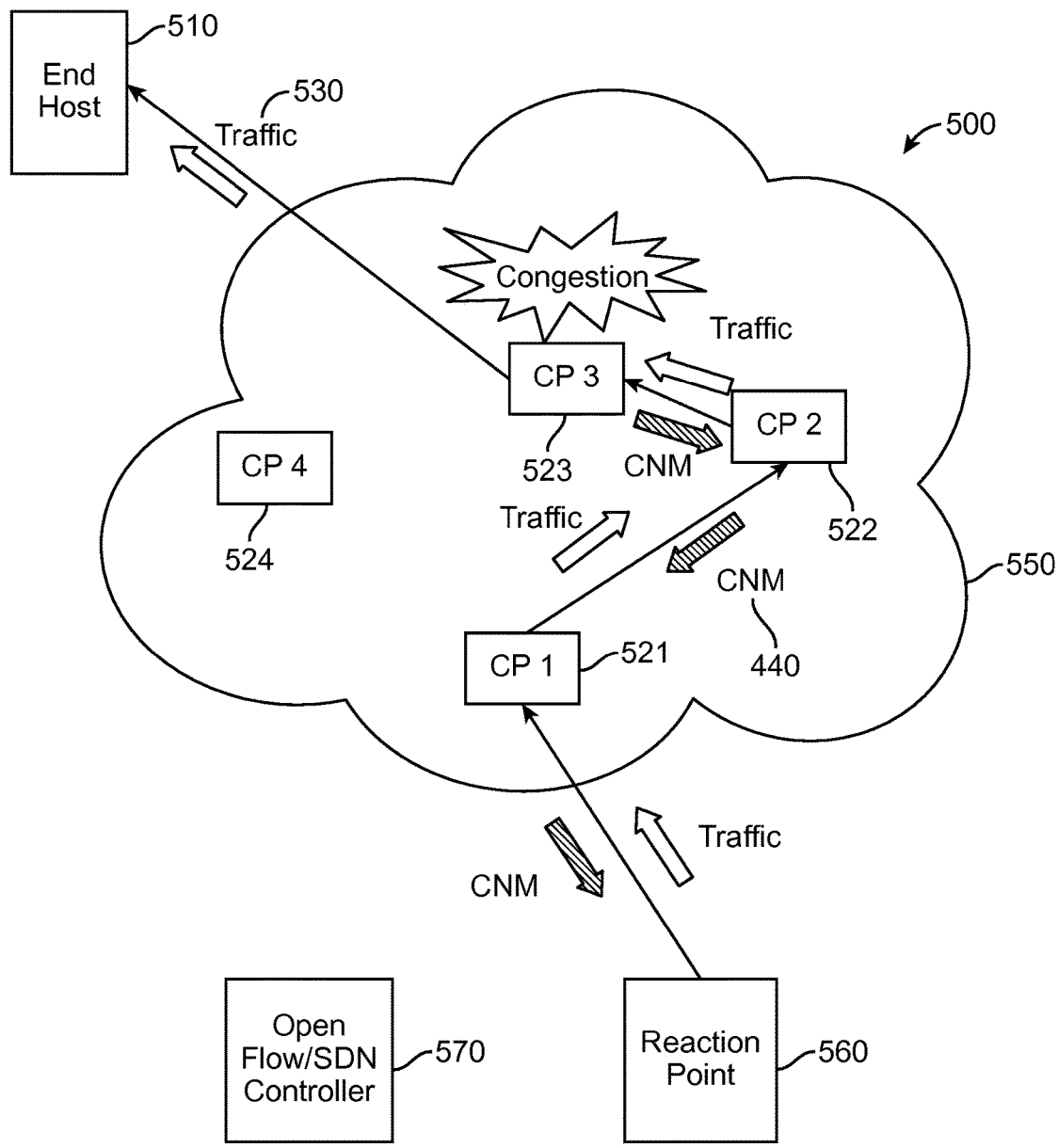
FIG. 5 illustrates a block diagram illustrating an Open Flow/SDN system using QCN that may be used with an embodiment of the invention.

FIG. 5 illustrates a block diagram illustrating a system 500 (e.g., an Open Control/SDN system, a data center, etc.) using QCN that may be used with an embodiment of the invention. System 500 includes an end host 510, CP 1 521, CP 2 522, CP 3 523 and CP 4 524, RP 560 and Open Flow/SDN Controller 570 in a network 550 (e.g., wired, wireless, cloud environment, etc.). In system 500, the CPs 1-4 521-524 each may include an OpenFlow switch connected with the controller 570. The system 500 may include one or more computing systems or end hosts 510 connected to the CPs 1-4 521-524. OpenFlow provides an open protocol to program one or more flow tables in different switches and routers. The data path of the switch comprises of a flow table, and an action associated with each flow entry. The set of actions supported by each switch of each CP 1-4 521-524 is extensible. The switch of each CP 1-4 521-524 comprises at least three parts: the flow table, with an action associated with each flow entry to inform the switch how to process the communication flow, a secure channel that connects the switch to the controller 570 that allows commands and packets to be sent between the controller 570 and the switch using the OpenFlow protocol, which provides an open and standard way for the controller 570 to communicate with the switches. By specifying a standard interface (the OpenFlow protocol) through which entries in the flow table may be defined externally, the switches avoid the necessity for having to be programmed.

The switches of CPs 1-4 521-524 may have one or more application specific integrated circuits (ASICs) that may include one or more flow tables. The flow table 430 may comprise one or more Ternary content addressable memory (TCAM) devices, or other hardware devices. The switches of CPs 1-4 521-524 may comprise a dedicated OpenFlow switch that does not support normal Layer 2 and Layer 3 processing, or an OpenFlow-enabled general purpose Ethernet switch, for which the Open-Flow protocol and interfaces have been added as a feature. A dedicated OpenFlow switch is a "dumb" data path element that forwards packets between ports, as defined by the controller 570.

Flows of the switches of the CPs 1-4 521-524 may be broadly defined, and are limited only by the capabilities of the particular implementation of the flow table. For example, a flow may comprise a transmission control protocol (TCP) connection, all packets from a particular media access control (MAC) address or Internet protocol (IP) address, all packets with the same virtual local area network (VLAN) tag, all packets from the same switch port, etc. Each flow entry has an action associated with it; such as basic actions (that all dedicated OpenFlow switches support). One basic action is to forward the flow's packets to a given port (or ports), which allows packets to be routed through the network 550. Another basic action is to encapsulate and forward the flow's packets to the controller 570. A packet is delivered to the secure channel, where it is encapsulated and sent to the controller 570. This action may be used for the first packet in a new flow, so that the controller 570 may determine if the flow should be added to the flow table. Another action may comprise dropping the flow's packets. This action may be used for security, to curb denial of service attacks, to reduce spurious broadcast discovery traffic from end-hosts, etc.

The flow tables of switches that are connected are managed by the same controller 570. The OpenFlow protocol allows each switch to be controlled by two or more controllers for increased performance or robustness. In a classical router or switch, the fast packet forwarding (data path) and the high level routing decisions (control path) occur on the same device. An OpenFlow switch separates these two functions. The data path portion resides on the switch, while high-level routing decisions are moved to the controller 570 (e.g., a server). The OpenFlow switch and controller 570 communicate via the OpenFlow protocol, which defines messages, such as packet-received, send-packet-out, modify-forwarding-table, and get-statistics. The data path of the OpenFlow switch presents a clean flow table abstraction, where each flow entry contains a set of packet fields to match, and an action (such as send-out-port, modify-field, or drop). When the OpenFlow switch receives a packet for the first time (i.e., never received before), for which it has no matching flow entries, the OpenFlow switch sends this packet to the controller 570. The controller 570 then makes a decision on how to handle this packet. The controller 570 may drop the packet, or it may add a flow entry directing the switch on how to forward similar packets in the future.

In the network 550, congestion is determined based on the queues by CP 3 523, which then generates a CNM 440 and sends it to the RP 560. In the typical system 500, the CNM 440 must be reflected and routed through CP 2 522 and CP 1 521 in order to be received by the RP 560, which may then adjust the traffic flow 530 that has the indicated path from the RP 560, to CP 1 521, to CP 2 522, to CP 3 523 and to the end host 510.

Figure 6:
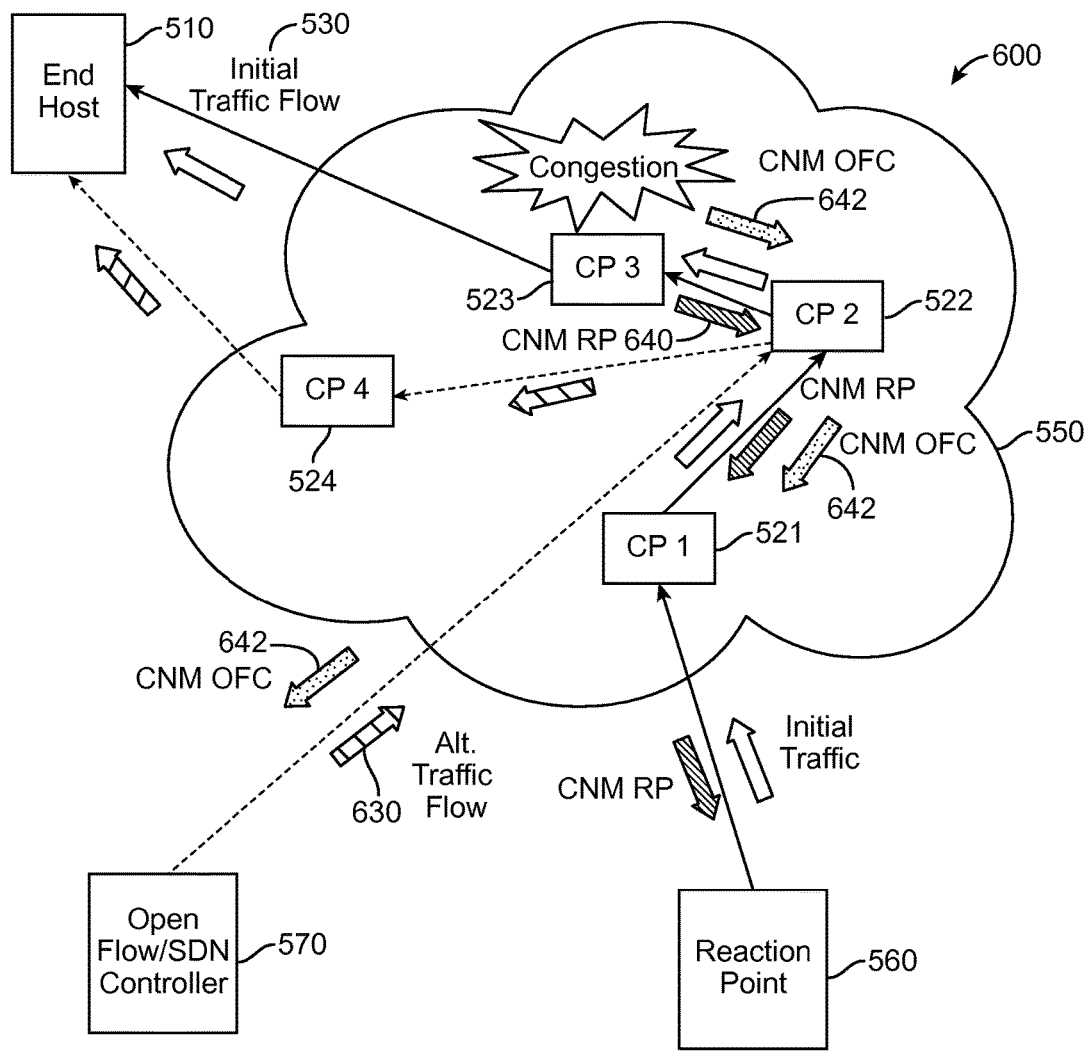
FIG. 6 illustrates a block diagram illustrating an Open Flow/SDN system using modified QCN, in accordance with an embodiment of the invention.

FIG. 6 illustrates a block diagram illustrating a system 600 including an Open Flow/SDN network 550 using modified QCN, in accordance with an embodiment of the invention. In one embodiment, the switches of the CPs 1-4 521-524 determine congestion based on the queues in the NIC/CAN and generate an additional CNM 642 (CNM OFC) that is sent directly to the controller 570. In one example embodiment, when CP 3 523 determines that congestion exists, CP 3 523 generates and send a CNM OFC 642 directly to the controller 570 (i.e., does not follow the path through other CPs, such as CP 2 522 and CP 1 521) and also generates a CNM RP 640 that is sent to the RP 560.

In an Open Flow environment (e.g., system 600), both the Open Flow Controller (e.g., controller 570) and RPs (e.g., RP 560) may react to the CNM to provide better mitigation against congestion. The RPs, like in conventional networks, react to the CNM messages to throttle traffic flows. In addition, the Open Flow Controller, for equal cost multipath (ECMP), may switch to the least end-to-end congested link. In one embodiment, for faster response than a conventional system, rather than the RPs sending their CNMs to the Open Flow Controller and introducing delay, the CPs (e.g., CP 1-4 521-524) are configured to directly send the CNMs to both the Open Flow controller (e.g., CNM OFC 642) and the RPs (e.g., CNM RP 640). In one embodiment, the congestion reaction is quickly performed at the Open Flow controller (e.g., controller 570) and a less congested route is selected with less delay than a conventional system.

In one embodiment, when the system 600 is an Open Flow environment, a knob/configuration is created in the CPs 1-4 521-524 to generate a first CNM OFC 642 directly to the Open Flow Controller (e.g., controller 570) and a second CNM RP 640 to the RPs (e.g., RP 560). In one embodiment, where the controller 570 is an Open Flow Controller, for ECMP paths, the CNM OFC 642 is used to calculate the next-available ECMP path to prevent end-to-end congestion. In one embodiment, the CPs 1-4 521-524 know the controller 570 address and create the CNM OFC 642 using the DA of the controller 570.

In one embodiment, in a system 600 where the Endpoint/RPs (e.g., RP 560) do not implement IEEE 802.1Qau type of congestion notification, the CNM RP 640 is not processed by these types of RPs. In one embodiment, the CNM OFC 642 messages are generated and directly sent and processed directly by the OpenFlow/SDN controller (e.g., controller 570). In example embodiment, the OpenFlow controller (e.g., controller 570) may redirect the traffic on the least end-to-end congested link. Therefore, in one embodiment, congestion mitigation may be performed even if the Endpoints and other elements of the link do not support congestion notification using a standard protocol (e.g., IEEE 802.1Qau).

In one example embodiment, the traffic in system 600 is shown to initially flow from RP 560 to CP 1 521 to CP 2 522 to CP 3 523 and to the end host 510 (direction of the traffic flow arrows 530). In one example embodiment, CP 3 523 determines that congestion exists based on the queue information. In one example embodiment, CP 3 523 generates a CNM OFC 642 and a CNM RP 640. In this example embodiment, the CNM OFC 642 is sent directly to the DA of the controller 570 and the CNM RP 640 is sent to the RP 560. In one example embodiment, the CNM OFC 642 and CNM RP 640 have different paths to the different Das (of the controller 570 and RP 560). In one example, there are two ECMP paths to reach the end host 510. These example paths are CP 1 521 to CP 2 522 to CP 3 523 to the end host 510, and CP 1 521 to CP 2 522 to CP 4 524 to the end host 510. In one example, after receiving the CNM RP 640, the RP 560 throttles the traffic flow. In one embodiment, in addition to the RP 560 throttling traffic flow, the Open Flow Controller (e.g., controller 570) selects an alternate traffic path, indicated as alternate traffic path 630, which changes the traffic flow to the path CP 1 521 to CP 2 522 to CP 4 524 to the end host 510, from the ECMP list and relieves the congestion.

In one embodiment, in a system that doesn't implement congestion notification, the RP 560 cannot use the CNM RP 640 and cannot adjust or throttle traffic. In one embodiment, however, the controller 570 changes the traffic path or selects a different ECMP path, which relieves traffic congestion at the CP 3 523 (or any other CP that determines a congestion condition exists).

In one or more embodiments, the use of the CNM OFC 642 has the advantage over traditional congestion notification systems as a CP generates a CNM (e.g., CNM OFC 642) directly to an Open Flow Controller (e.g., controller 570); hence reaction time is faster than having the RPs traditionally reflecting CNMs to the Open Flow Controller; an Open Flow controller (e.g., controller 570) may select the next available ECMP path end-to-end achieving better congestion results than conventional networks; conventional networks can only react to the CNM messages at the RP, whereas the one or more embodiments of the invention immediately address congestion with a two fold strategy by the RP 560 and the controller 570.

Figure 7:
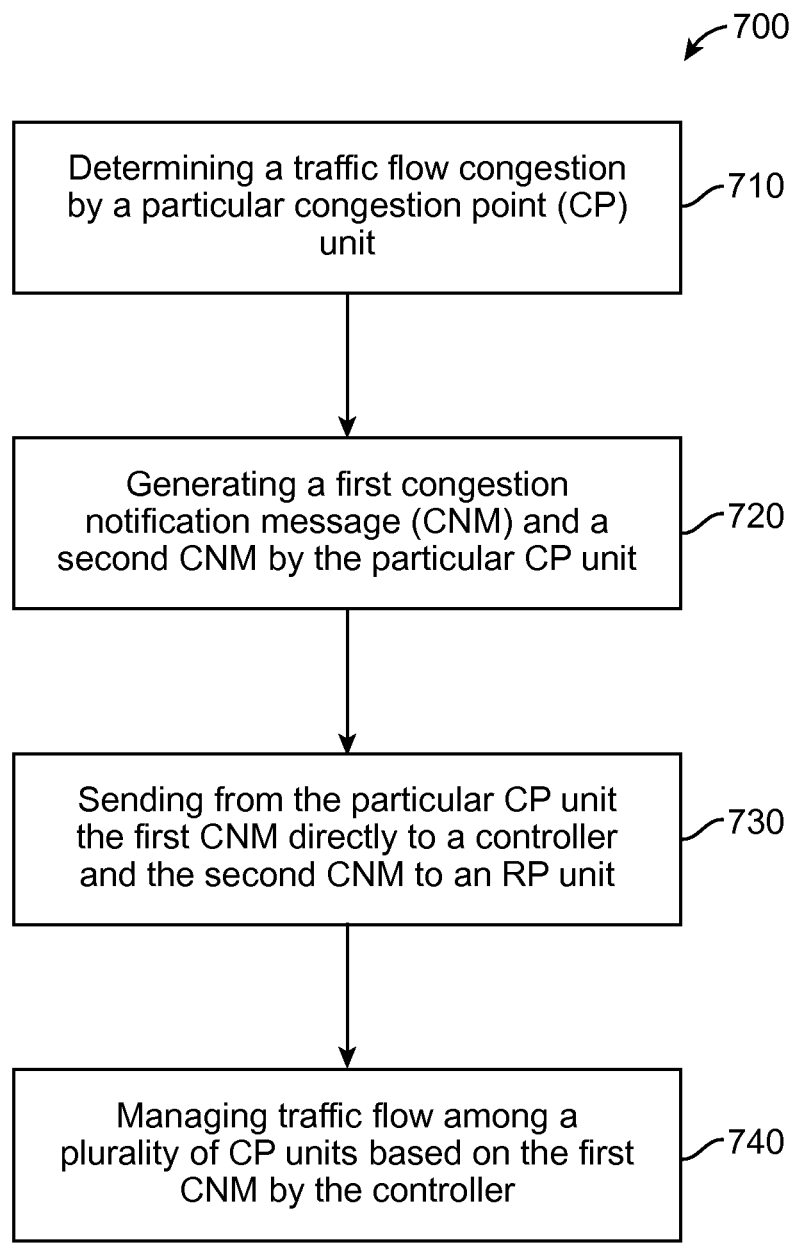
FIG. 7 is a block diagram of a process for a modified QCN for Open Flow/SDN systems, according to one embodiment of the invention.

FIG. 7 is a block diagram of a process 700 for a modified QCN for Open Flow/SDN networks, according to one embodiment of the invention. In one embodiment, in block 710 a traffic flow congestion is determined by a particular CP unit/device (e.g., based on a traffic queue) of a plurality of CP units/devices (e.g., CPs 1-4 521-524, FIG. 6) that communicate with at least one end unit/host (e.g., end host 510), at least one RP (e.g., RP 560) unit/device and at least one controller (e.g., controller 570) in a network (e.g., 550). In one embodiment, in block 720 the particular CP that determined the congestion generates a first CNM (e.g., CNM OFC 642, FIG. 6) and a second CNM (e.g., CNM RP 640).

In one embodiment, in block 730 the particular CP device/unit sends the first CNM directly to the controller, and sends the second CNM to the at least one RP unit. In one embodiment, in block 740 the controller manages traffic flow among the plurality of CP units/devices based on the first CNM. In one embodiment, managing traffic flow includes throttling traffic flow for the plurality of CP units/devices by the RP unit/device based on the second CNM. In one embodiment, managing traffic flow further includes determining, by the controller, an alternate traffic flow path (e.g., among ECMP paths) for the plurality of CP units/devices for avoiding the traffic flow congestion, and the controller switches traffic flow to the alternate traffic flow path for the plurality of CP units/device.

In one embodiment, the controller comprises an Open Flow controller, an SDN controller, etc. In one embodiment, the plurality of CP units/devices each comprise a physical switch device. In one embodiment, process 700 further includes generating only the first CNM by the particular CP unit/device, determining, by the controller, an alternate traffic flow path for the plurality of CP units/device for avoiding the traffic flow congestion, and switching, by the controller, traffic flow to the alternate traffic flow path for the plurality of CP units, and the system/network does not implement a QCN standard protocol (e.g., IEEE IEEE 802.1Qau).

The system 600 may include one or more source programs, executable programs (object code), scripts, or any other entity comprising a set of computer program instructions to be performed. When the system 600 includes a source program, then the program is usually translated via a compiler, assembler, interpreter, or the like, which may or may not be included within a storage device. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, propagation medium, or other physical device or means that can contain or store a computer program for use by or in connection with a computer related system or method.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, propagation medium, or other physical device or means that can contain or store a computer program for use by or in connection with a computer related system or method.

More specific examples (a non-exhaustive list) of the computer-readable medium would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched (as in paper tape, punched cards, etc.), as the program can be electronically captured, via for instance optical scanning of the paper or other medium, then compiled, interpreted or otherwise processed in a suitable manner if necessary, and then stored in a computer memory.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

In one embodiment, where the system 600 is implemented in hardware, the system 600 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be emphasized that the above-described embodiments of the present invention, particularly, any "preferred" embodiments, are merely possible examples of implementations, merely set forth for a clear understanding of the principles of the invention.

Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A method comprising:
  determining, by a congestion point (CP) unit, traffic flow congestion in an Open Flow environment network, wherein the CP unit comprises an Open Flow switch including a flow table where an action is associated with each flow entry in the flow table;
  generating, by the CP unit, a first congestion notification message (CNM) and a second CNM; and
  sending, by the CP unit, the first CNM directly to at least one controller and sending the second CNM directly to at least one reaction point (RP) unit;
  wherein traffic flow of a plurality of CP units including the CP unit is managed based on the first CNM, and the CP unit communicates with the at least one controller through a secure channel via Open Flow protocol.

2. The method of claim 1, wherein management of traffic flow is managed by throttling of traffic flow for the plurality of CP units based on the second CNM.

3. The method of claim 2, wherein
  an alternate traffic flow path is determined for the CP unit for avoiding the traffic flow congestion.

4. The method of claim 3, further comprising:
  causing, by the CP unit, a determination of a next available equal cost multipath (ECMP) path for traffic flow based on the first CNM.

5. The method of claim 4, wherein the CP unit is an edge bridge, and the Open Flow switch is a physical device.

6. The method of claim 4, wherein the Open Flow switch is a physical switch device.

7. The method of claim 6, further comprising:
  receiving, by the CP unit, an alternate traffic flow path to avoid the traffic flow congestion; and
  switching, by the CP unit, to the alternate traffic flow path, wherein the Open Flow network environment does not implement a quantized congestion notification (QCN) standard protocol.

8. A computer program product comprising a computer-readable hardware storage medium having program code embodied therewith, the program code being executable by a congestion point (CP) device to implement a method comprising:
  determining, by the CP device, traffic flow congestion in an Open Flow environment network, wherein the CP device comprises an Open Flow switch including a flow table where an action is associated with each flow entry in the flow table;
  generating, by the CP device, a first congestion notification message (CNM) and a second CNM;

sending, by the CP device, the first CNM directly to at least one controller and sending the second CNM directly to at least one reaction point (RP) unit; and causing, by the CP unit, managing of traffic flow based on the first CNM, wherein the CP device communicates with the at least one controller through a secure channel via Open Flow protocol.

9. The computer program product of claim 8, wherein the CP device causes the at least one RP unit to manage traffic flow by throttling traffic flow for based on the second CNM.

10. The computer program product of claim 9, wherein managing traffic flow further comprises:

causing, by the CP device, the at least one controller to determine an alternate traffic flow path for the CP device to avoid the traffic flow congestion; and causing, by the CP device, the at least one controller to switch traffic flow to the alternate traffic flow path for the CP device.

11. The computer program product of claim 10, wherein the at the CP unit causes the at least one controller to determine a next available equal cost multipath (ECMP) path for traffic flow based on the first CNM.

12. The computer program product of claim 11, wherein the at CP device is an edge bridge, and the Open Flow switch is a physical switch device.

13. The computer program product of claim 8, further comprising:

causing, by the CP device, the at least one controller to determine an alternate traffic flow path for the CP device to avoid the traffic flow congestion; and causing, by the CP device, the at least one controller to switch traffic flow to the alternate traffic flow path for the CP device, wherein the Open Flow network environment does not implement a quantized congestion notification (QCN) standard protocol.

14. An apparatus comprising:

a congestion point (CP) device configured to determine traffic flow congestion in an Open Flow network environment, to generate a first congestion notification message (CNM) and a second CNM, to send the first CNM directly to a controller, and to send the second CNM directly to a reaction point (RP) device, wherein the CP device comprises an Open Flow switch including a flow table where an action is associated with each flow entry in the flow table, the CP device is further configured to cause the controller to manage traffic flow for the CP device based on the first CNM, and the CP device communicates with the controller through a secure channel via Open Flow protocol.

15. The apparatus of claim 14, wherein the CP device is configured to cause the RP to throttle traffic flow based on the second CNM.

16. The apparatus of claim 15, wherein the CP device is configured to receive an alternate traffic flow path to avoid the traffic flow congestion.

17. The apparatus of claim 16, wherein the CP device is configured to cause the controller to determine a next available equal cost multipath (ECMP) path for traffic flow based on the first CNM.

18. The apparatus of claim 16, wherein the Open Flow switch is a physical switch device.

19. The apparatus of claim 14, wherein the RP device and the CP device do not use a quantized congestion notification (QCN) standard protocol.

20. The apparatus of claim 14, wherein the Open Flow network environment is a datacenter.

* * * * *